United States Patent
Chang et al.

(10) Patent No.: US 7,350,955 B2
(45) Date of Patent: Apr. 1, 2008

(54) BACK LIGHT SOURCE MODULE

(75) Inventors: Chih-Li Chang, Tao-Yuan Hsien (TW); Hung-Chen Kao, Tao-Yuan Hsien (TW)

(73) Assignee: Hannstar Display Corporation, Yang-Mei, Tao-Yuan Hsien (TW)

( * ) Notice: Subject to any disclaimer, the term of this patent is extended or adjusted under 35 U.S.C. 154(b) by 27 days.

(21) Appl. No.: 11/292,183

(22) Filed: Dec. 1, 2005

(65) Prior Publication Data
US 2006/0203465 A1 Sep. 14, 2006

(30) Foreign Application Priority Data
Mar. 9, 2005 (TW) ................ 94107226 A

(51) Int. Cl.
  F21V 7/04 (2006.01)
  F21V 21/00 (2006.01)
  G02F 1/1335 (2006.01)

(52) U.S. Cl. ............ 362/612; 362/613; 362/249; 349/68

(58) Field of Classification Search ........... 362/611, 362/29, 97, 231, 240, 612, 613, 252, 800, 362/249; 349/61, 68
See application file for complete search history.

(56) References Cited

U.S. PATENT DOCUMENTS

| | | | |
|---|---|---|---|
| 5,101,326 A * | 3/1992 | Roney | 362/545 |
| 5,921,652 A * | 7/1999 | Parker et al. | 362/601 |
| 6,431,728 B1 * | 8/2002 | Fredericks et al. | 362/249 |
| 6,578,979 B2 * | 6/2003 | Truttmann-Battig | 362/92 |
| 6,913,366 B2 * | 7/2005 | Lee | 362/628 |
| 7,152,996 B2 * | 12/2006 | Luk | 362/240 |
| 2001/0055204 A1 * | 12/2001 | Mitsuteru | 362/27 |
| 2003/0218874 A1 * | 11/2003 | Fujino et al. | 362/31 |
| 2004/0213017 A1 * | 10/2004 | Chou et al. | 362/558 |
| 2006/0087866 A1 * | 4/2006 | Ng et al. | 362/612 |
| 2007/0035966 A1 * | 2/2007 | Ide | 362/608 |

* cited by examiner

Primary Examiner—John Anthony Ward
Assistant Examiner—David R Crowe
(74) Attorney, Agent, or Firm—Morris Manning Martin LLP; Tim Tingkang Xia, Esq.

(57) ABSTRACT

A back light source module of a liquid crystal device is provided. The back light source module includes a backplate, a light source fixture disposed on the backplate. The back light source module also includes a first light source having a first normal line and disposing on the light source fixture, a second light source having a second normal line and disposing on the light source fixture, and a third light source having a third normal line and disposing on the light source fixture. Among them, a first angle is formed between the second normal line and the first normal line, a second angle is formed between the third normal line and the first normal line, and both the first angle and the second angle are less than 90 degrees.

20 Claims, 11 Drawing Sheets

BACK LIGHT SOURCE MODULE

CROSS-REFERENCE TO RELATED APPLICATIONS

This non-provisional application claims priority under 35 U.S.C. § 119(a) on Patent Application No. 094107226 filed in Taiwan, R.O.C. on Mar. 9, 2005, the entire contents of which are hereby incorporated by reference.

BACKGROUND OF THE INVENTION

1. Field of the Invention

The invention relates to a back light source module, and more particularly, to a back light source module of liquid crystal device (LCD); the back light source module makes use of the arranging mode of a plurality of light sources to reduce the thickness of the back light source module, and moreover, to achieve a relatively better light mixing effect.

2. Description of the Prior Art

Most of the back light source modules of liquid crystal device of the prior art utilizes cold cathode fluorescent lamp (CCFL) as their light sources. Take direct-light-type back light source module for example, following trend of increasing the size of the liquid crystal device, in order to meet the requirement of certain specific luminance, the number of CCFL will increase accordingly. However, since the CCFL contains poisonous mercury, the quantity of utilization in the future will reduce following the ever-rising environmental consciousness.

Therefore, the manufacturers of the liquid crystal device are trying every possible ways to develop various types of substitute of light source in order to overcome the above-mentioned problems. Among them, Light Emitting Diode (LED) is a well-known one. FIG. 1 is a schematic diagram of a direct-light-type back light source module 101 of the prior art. As shown in FIG. 1, the direct-light-type back light source module 101 includes respectively a plurality of first light sources 11, a plurality of second light sources 12, and a plurality of third light sources 13, displaced in rows and columns on a backplate 30. There is a reflecting member 15 displaced among the first light source 11, the second light source 12, the third light source 13, and the backplate 30. In addition, the direct-light-type back light source module 101 has a thickness τ. One of the preferred light sources of the first light source 11, second light source 12, and the third light source 13 can be the above-mentioned LED.

This kind of LED can directly utilize a white light emitting diode (W-LED), or employ a three-original-color including red, green, and blue of light emitting diode (R-LED ; G-LED; B-LED) to perform light mixing.

TABLE 1 is a table of the comparison of the characteristics of various kinds of light source of the invention. As shown in TABLE 1, one can understand that the luminous uniformity and the chromatic intensity of the liquid crystal device employing CCFLs as light sources are relatively worse.

The comparison of the characteristics of various kinds of light source of the invention

TABLE 1

|  | CCFL (direct-light-type) | Three-original-color (direct-light-type) | Three-original-color (side-light-type) |
| --- | --- | --- | --- |
| Luminous uniformity | X | X | ○ |
| Chromatic intensity | X | ○ | ○ |
| Module thickness | ○ | X | ○ |
| Light source | ○ | X | ○ |

Although performing light mixing by employing a three-original-color light emitting diode can obtain better chromatic intensity, it will result in the fact that the luminous uniformity is not good enough in the situation of employing direct-light-type back light source module since the LED is a light source having high orientation. In order to improve the luminous uniformity, i.e. to achieve an optimum light mixing effect, the thickness τ of the back light source module should be greater than the thickness of LCD employing CCFL as light source. Therefore, as far as the design of direct-light-type of back light source module is concerned, the light source employing three-original-color light emitting diode is not an ideal light source.

For comparison, the side-light-type back light source module that employs the mixing light of the three-original-color LED as light source has better luminous uniformity, chromatic intensity, and thinner module thickness, i.e. is a better light source. However, as comparing with the back light source module employing only the W-LED as light source, in order to achieve similar light mixing effect, its thickness τ is thicker than that of the back light source module that employs only the W-LED as light source. Moreover, as far as the power utilization and transfer are concerned, the white light emanated by the W-LED is not as strong as the white light mixed by the three-original-color light emitting diode.

FIG. 2 is the optical frequency spectrum of various types of light source. As shown in FIG. 2, the distribution of the optical frequency spectrum is in a range between 600 to 680 nm for the R-LED, in a range between 480 to 580 nm for the G-LED, and in a range between 450 to 530 nm for the B-LED respectively. As for the distributions of the optical frequency spectrum for CCFL light emitting diode, it is in a range between 400 to 700 nm. Therefore, the distribution of the optical frequency spectrum of the three-original-color light emitting diode, i.e. the R, G, and B LED, is narrower than that of the CCFL. As far as the normalized chromatic intensity is concerned, all the three-original-color LED including the R, G, and B ones can attain a value of 1 while the CCFL can attain a value of 1 only in a range between 530 to 550 nm. The value of the normalized chromatic intensity of the CCFL can only attain a value of less than 0.5 for the rest of ranges in the optical frequency spectrum except the above-mentioned range between 530 to 550 nm. Consequently, the chromatic intensity is relatively higher for the white light mixed by the three-original-color LED. Therefore, theoretically, the light source mixed by the three-original-color LED is still a good choice.

SUMMARY OF THE INVENTION

In view of the above-mentioned problems of the prior art, the objective of the invention is to provide a back light source module for resolving the problem that the luminous uniformity and chromatic intensity are not good enough. The other objective of the invention is to overcome the fact that the thickness of the three-original-color LED is relatively thicker. The further objective of the invention is to improve the problems of the power utilization and transfer of the W-LED.

To achieve the above-mentioned objectives, the invention provides a back light source module that includes a backplate, a light source fixture disposed on the backplate. The back light source module also includes a first light sources having a first normal line and disposing on the light source fixture, a second light source having a second normal line and disposing on the light source fixture, and a third light source having a third normal line and disposing on light source fixture. Among them, a first angle is formed between the second normal line and the first normal line, a second angle is formed between the third normal line and the first normal line, and both the first angle and the second angle are less than 90 degrees.

Preferably, the first angle or the second angle is between 30 to 45 degrees.

Preferably, the first light source, the second light source, or the third light source is an R-LED, a G-LED, a B-LED, or a W-LED.

Preferably, the back light source module further includes a diffusing plate or a light guide plate disposed in corresponding with the backplate.

Preferably, the back light source module further includes a reflecting member disposed between the light source fixture and backplate.

In addition, the invention also provides a liquid crystal device including liquid crystal display panel, and an above-mentioned back light source module that is disposed in corresponding with liquid crystal display panel.

The accomplishment of this and other objectives of the invention will become apparent from the following description and its accompanying drawings of which:

DETAILED DESCRIPTION OF THE PREFERRED EMBODIMENT

Figure 1:
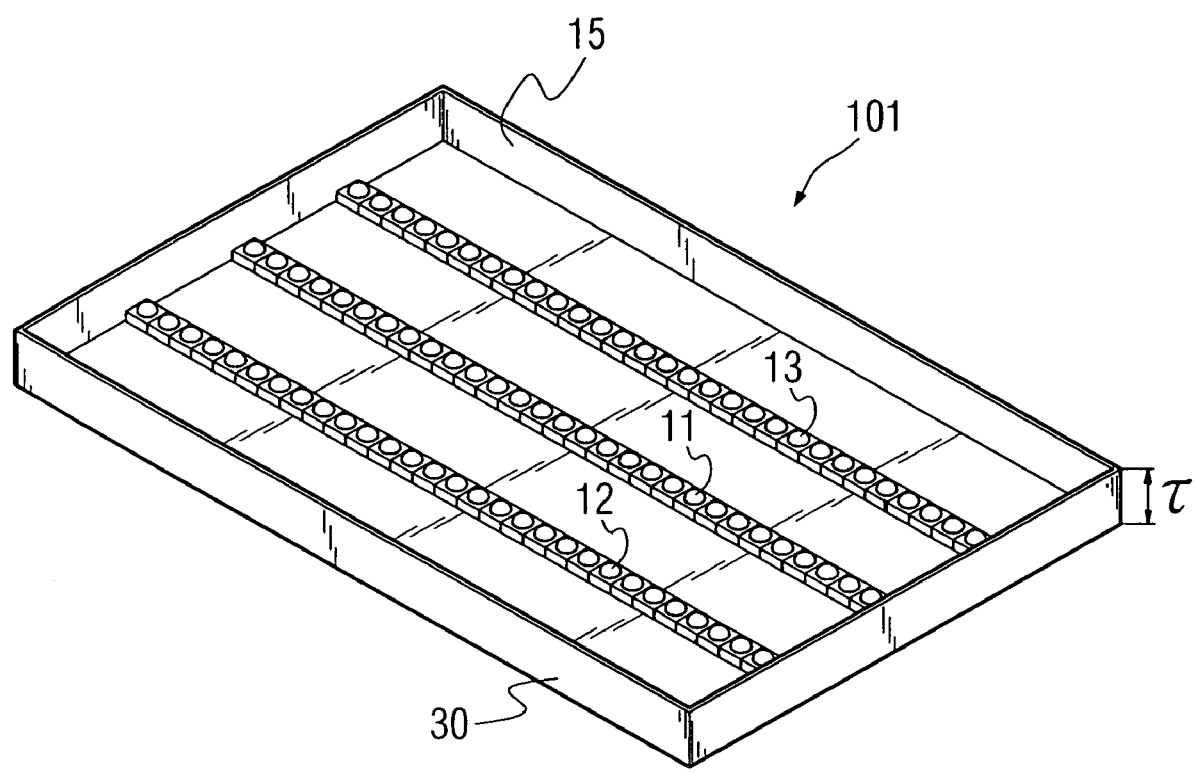
FIG. 1 is a schematic diagram of the back light source module of a LED of the prior art.
Figure 2:
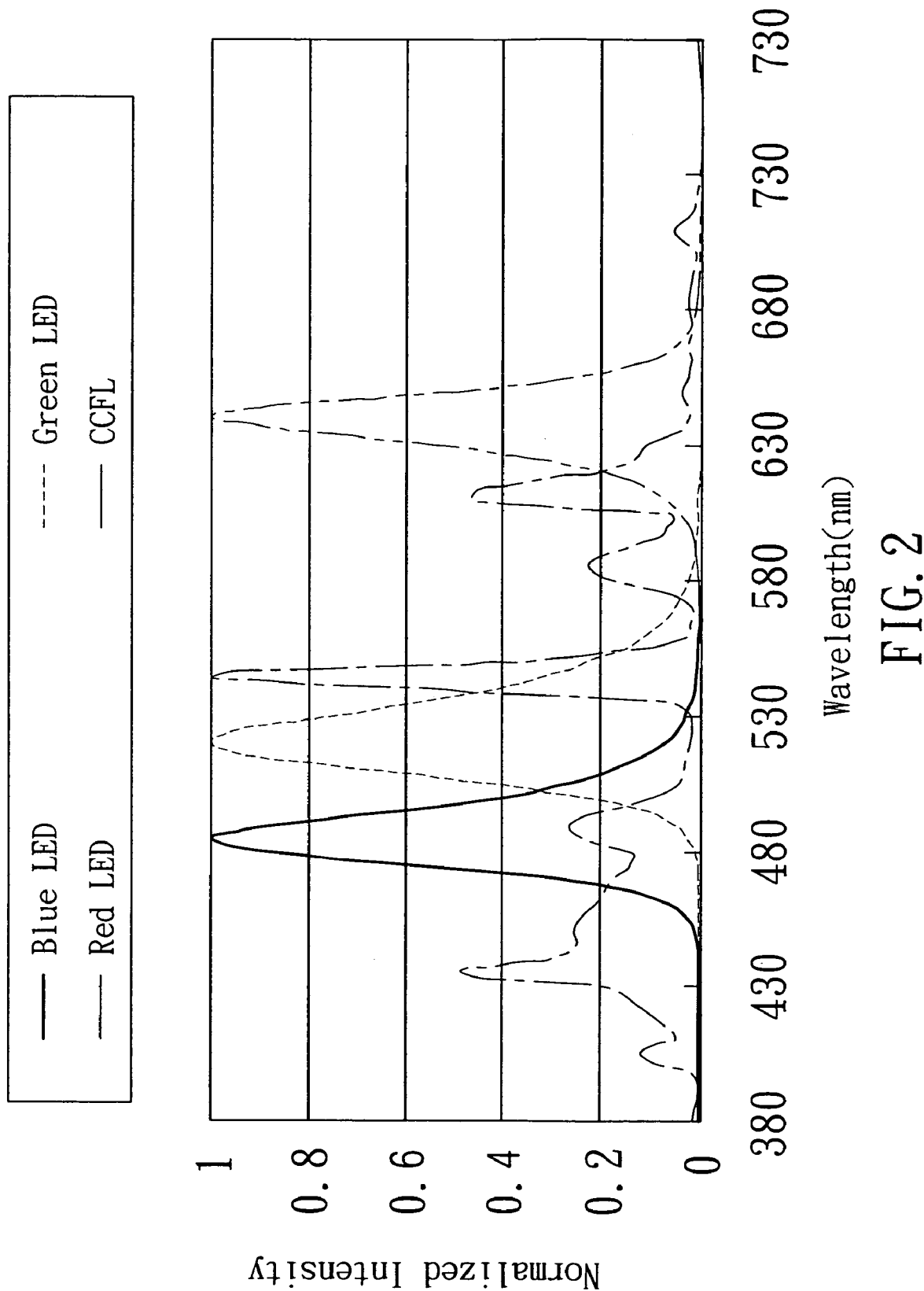
FIG. 2 is the optical frequency spectrum of various types of light source.
Figure 3:
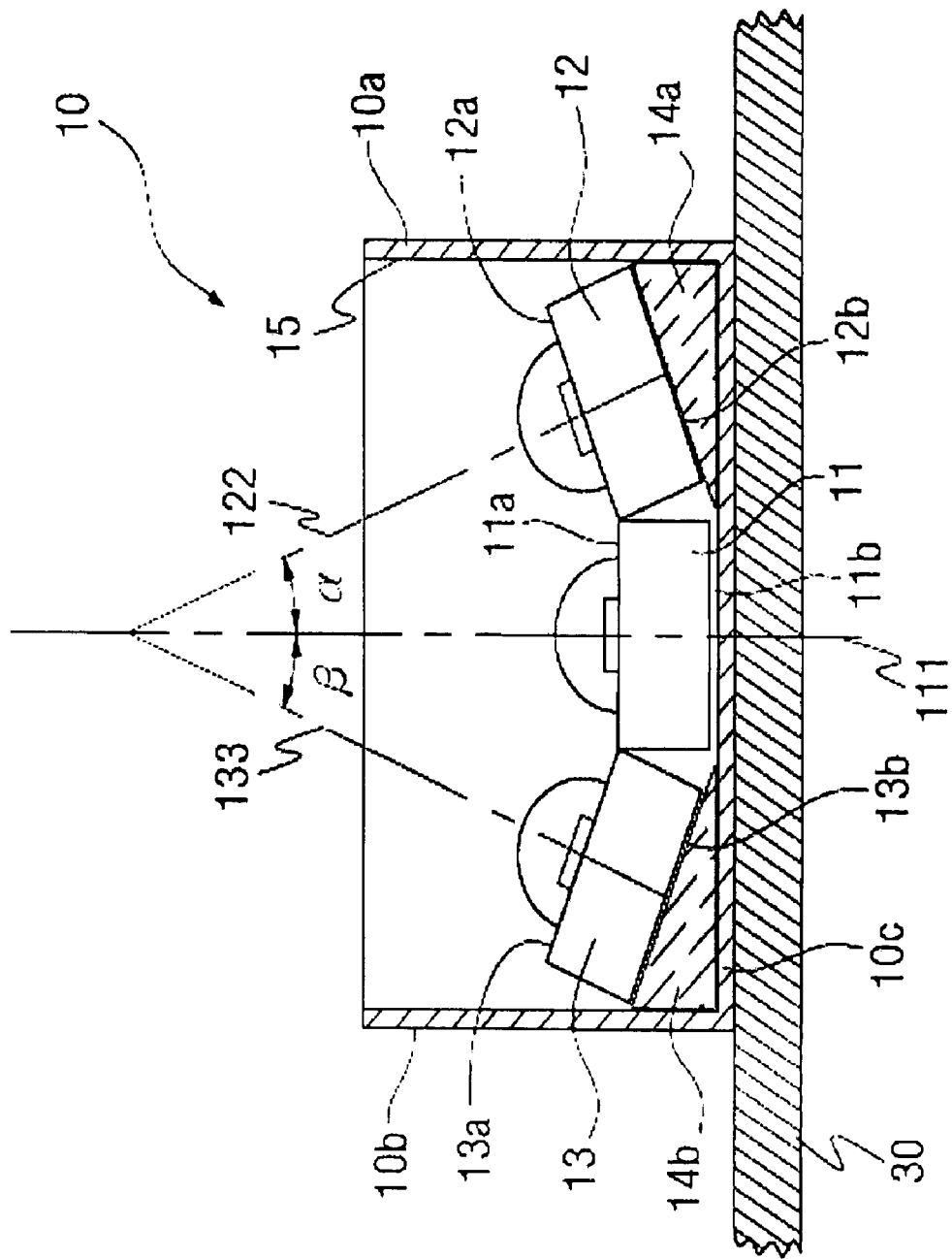
FIG. 3 is a schematic diagram of the light source fixture of the invention.

FIG. 3 is a back light source module (not shown in the Figure) of the invention. As shown in FIG. 3, the back light source module includes a light source fixture 10, a backplate 30, a reflecting member 15, a first light source 11, a second light source 12, and a third light source 13. Among them, the first light source 11, the second light source 12, and the third light source 13 are all arranged and packaged in the light source fixture 10 and are disposed on the backplate 30, and the reflecting member 15 is disposed on the backplate 30 too.

Referring to FIG. 3, the light source fixture 10 is disposed on the backplate 30, and the light source fixture 10 has a bottom wall 10c, a first lateral wall 10a, and a second lateral wall 10c. The first light source 11 is disposed on the bottom wall 10c, and has a bottom face 11b opposing to a light emitting face 10a thereof. The second light source 12 has a bottom face 12b opposing to a light emitting face 12a thereof, and is disposed between the bottom wall 10c and the first lateral wall 10a, so that the second light source 12 has the bottom face 12b facing both the bottom wall 10c and the first lateral wall 10a. The third light source 13 has a bottom face 13b opposing to a light emitting face 13a thereof, and is disposed between the bottom wall 10c and the second lateral wall 10b, so that the third light source 13 has the bottom face 13b facing both the bottom wall 10c and the second lateral wall 10b. The first light source 11, the second light source 12, and the third light source 13 has a first normal line 111, a second normal line 122, and a third normal line 133 respectively, where the first normal line 111 can be perpendicular to the light emanating plane of the light source fixture 10. Among them, the first normal line 111, the second normal line 122, and the third normal line 133 can constitute a plane, or the first normal line 111, the second normal line 122, and the third normal line 133 can project to a same plane. A first angle α, which is smaller than 90-degrees and preferably is somewhere between 30 to 45 degrees, is formed between the second normal line 122 and the first normal line 111. A second angle β, which is smaller than 90-degrees and preferably is somewhere between 30 to 45 degrees, is formed between the third normal line 133 and the first normal line 111.

According to the arrangement of the first light source 11, the second light source 12. and the third light source 13, a first available space 14a is formed by the bottom face 12b of the second light source 12, the first lateral wall 10a, and the bottom wall 10c. Meanwhile, a second available space 14b is formed by the bottom face 13b of the third light source 13. the second lateral wall 10b, and the bottom wall 10c. One can utilize these available spaces 14a, 14b for providing a heat dissipating mechanism (not shown in the Figure) or a circuit board (not shown in the Figure).

Figure 4A:
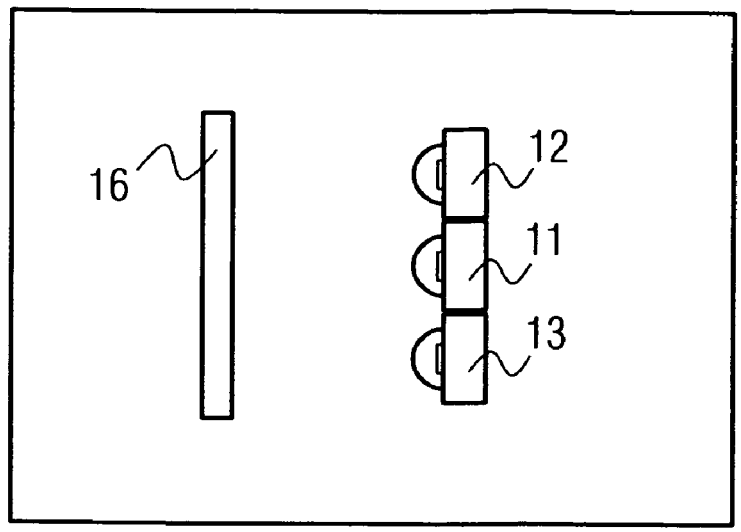
FIG. 4A is a schematic diagram of the arranging mode of the LED of the prior art.
Figure 4B:
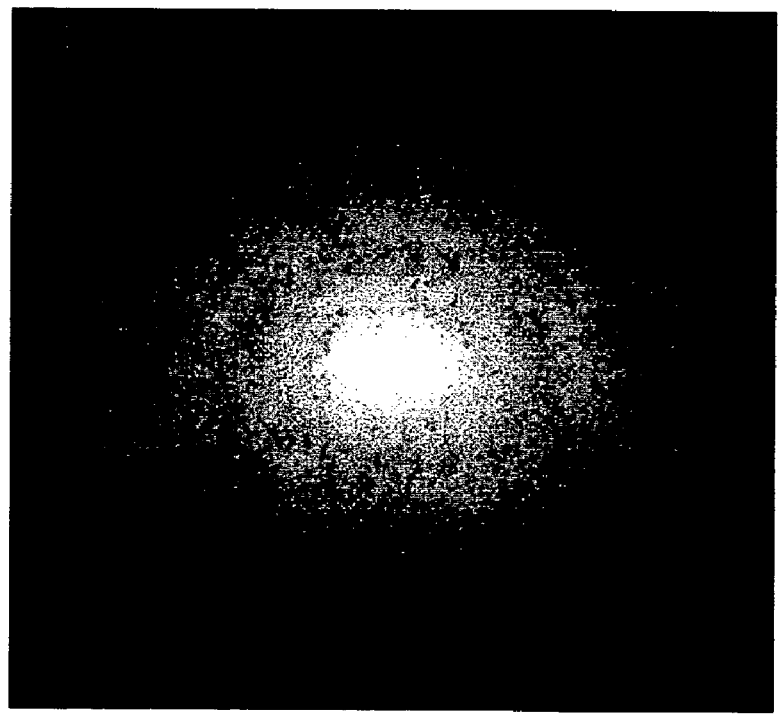
FIG. 4B is a schematic diagram of a light-mixing simulation of FIG. 4A.

FIG. 4A is a schematic diagram of the arranging mode of the LED of the prior art. As shown in FIG. 4A, the arranging mode of the LED of the prior art includes a first light sources 11, a second light source 12, a third light source 13, and an observing plane 16. Among them, the normal lines of the first light source 11, the second light source 12, and the third light source 13 are in parallel. FIG. 4B is a schematic diagram of a light-mixing simulation of FIG. 4A on the observing plane 16. In order to simplify the conditions of optical simulation, the luminance and the emanating number of light beam of the first light source 11, the second light source 12, and the third light source 13 are all set to be equal.

Figure 4C:
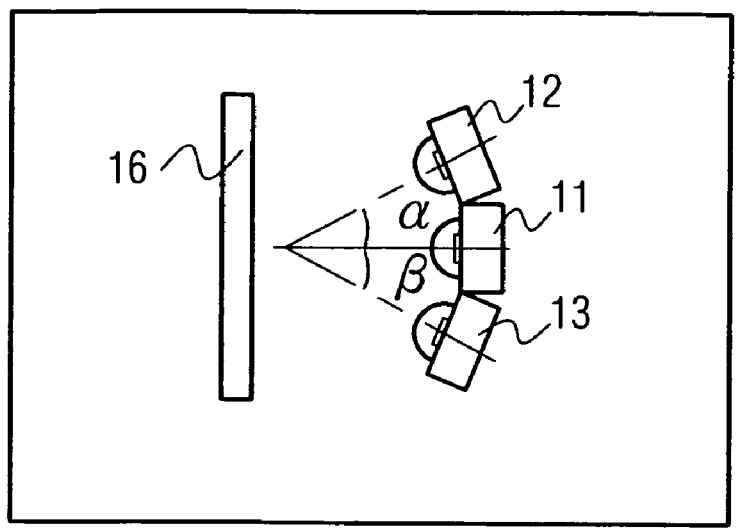
FIG. 4C is a the schematic diagram of the arranging mode of the LED of the invention.
Figure 4D:
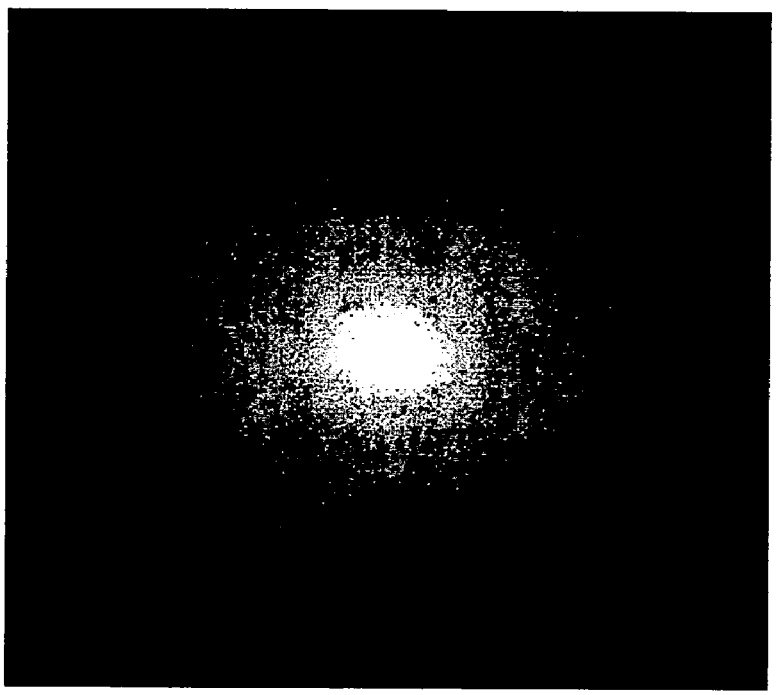
FIG. 4D is a schematic diagram of a light-mixing simulation of FIG. 4C.

FIG. 4C is a schematic diagram of the arranging mode of the LED of the invention. As shown in FIG. 4C, the arranging mode of the LED of the invention includes a first light sources 11, a second light source 12, a third light source 13, and an observing plane 16. Among them, a first angle α is formed between the normal lines of the first light source 11 and the second light source 12. A second angle β is formed between the normal lines of the first light source 11 and the third light source 13. FIG. 4D is a schematic diagram of a light-mixing simulation on the observing plane 16 of FIG. 4C. In order to simplify the conditions of optical simulation, the first light source 11, the second light source 12, and the third light source 13 are all set to be the same as those in FIG. 4B.

As comparing FIG. 4B with FIG. 4D, under the condition of the same light mixing distance, the light mixing in FIG. 4D is more thoroughly completed and the chromatic halo area is relatively smaller too. Thereby, it can achieve a better white light effect. Therefore, under the design condition of FIG. 4C, one can reduce the light mixing distance further, that is, reduce the thickness τ of the back light source module.

Figure 5A:
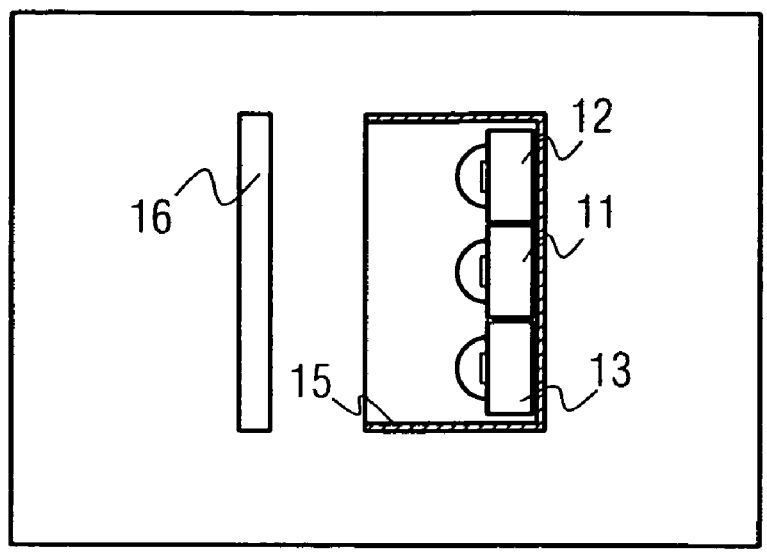
FIG. 5A is a schematic diagram of the lamp fixture of the prior art.
Figure 5B:
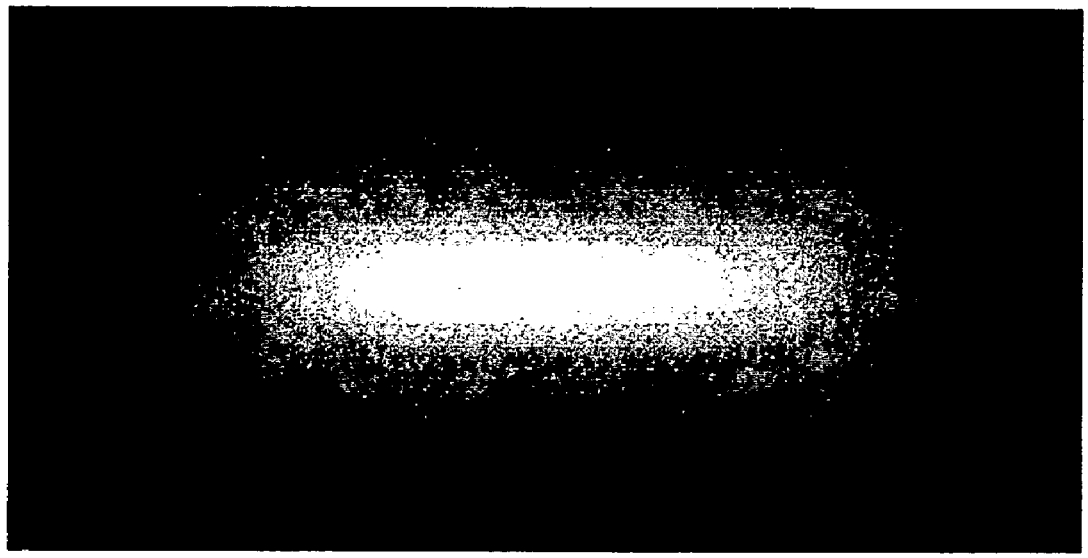
FIG. 5B is a schematic diagram of a light-mixing simulation of FIG. 5A.

FIG. 5A is a schematic diagram of the light source fixture 10 of the prior art. As shown in FIG. 5A, the light source fixture 10 of the prior art includes a first light sources 11, a second light source 12, a third light source 13, a reflecting member 15, and an observing plane 16. Among them, the normal lines of the first light source 11, the second light source 12, and the third light source 13 are in parallel. FIG. 5B is a schematic diagram of a light-mixing simulation on the observing plane 16 of FIG. 5A. In order to simplify the conditions of optical simulation, the luminance and the emanating number of light beam of the first light source 11, the second light source 12, and the third light source 13 are all set to be equal.

Figure 5C:
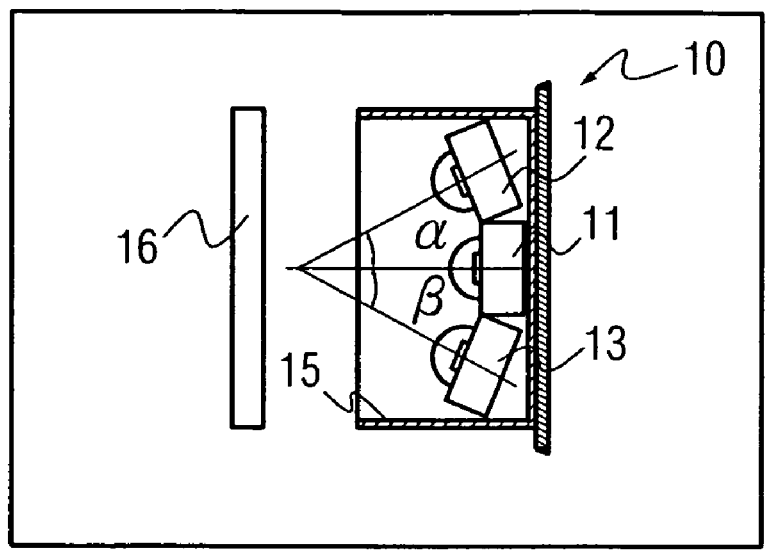
FIG. 5C is a schematic diagram of the lamp fixture of the invention.
Figure 5D:
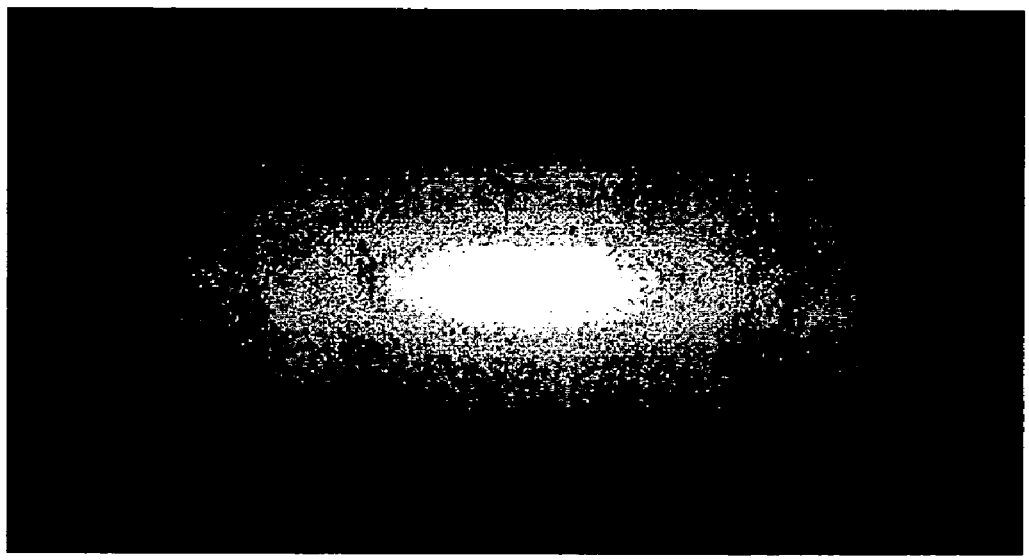
FIG. 5D is a schematic diagram of a light-mixing simulation of FIG. 5C.

FIG. 5C is a schematic diagram of the light source fixture 10 of the invention. As shown in FIG. 5C, the light source fixture 10 of the invention includes a first light sources 11, a second light source 12, a third light source 13, a reflecting member 15, and an observing plane 16. Among them, a first angle α is formed between the normal lines of the first light source 11 and the second light source 12. A second angle β is formed between the normal lines of the first light source 11 and the third light source 13. FIG. 5D is a schematic diagram of a light-mixing simulation on the observing plane 16 of FIG. 5C. In order to simplify the conditions of optical simulation, the first light source 11, the second light source 12, and the third light source 13 are all set to be the same as those in FIG. 5B.

As comparing FIG. 5B with FIG. 5D, under the condition of the same light mixing distance, the light mixing in FIG. 5D is more thoroughly completed. Moreover, the chromatic halo area is relatively smaller. Thereby, it can achieve a better white light effect. Therefore, under the design condition of FIG. 5C, one can reduce the light mixing distance further, that is, reduce the thickness τ of the back light source module.

As comparing FIG. 5D with FIG. 4D, under the function of the reflecting member 15, the light mixing area is relatively more concentrated in FIG. 5D. Therefore, the arranging mode of the light emitting diode of the invention can surely reduce the thickness of the back light source module.

Figure 6:
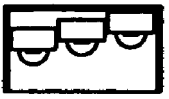
FIG. 6 is a schematic diagram of the arranging modes of the LED and their obtained simulating Watt values.

FIG. 6 is a schematic diagram of the arranging modes of the LED and their obtained simulating Watt values. In referring to FIG. 6, it shows the variation of the two-dimensional arrangement of the above-mentioned first light sources 11, second light source 12, and third light source 13. FIG. 6 also shows that each of LEDs, with their corresponding optical simulating Watt values shown underneath, has 15 pieces of 3-Watt light source. As shown in FIG. 6, the simulating Watt value of the prior art is 105.72 W while the simulating Watt value of the invention can achieve as high as 107.44 W. Therefore, the invention has relatively better power utilization and transfer as comparing with the prior art, preferably has its first angle α and second angle β both set between 30 to 45 degrees.

Figure 7A:
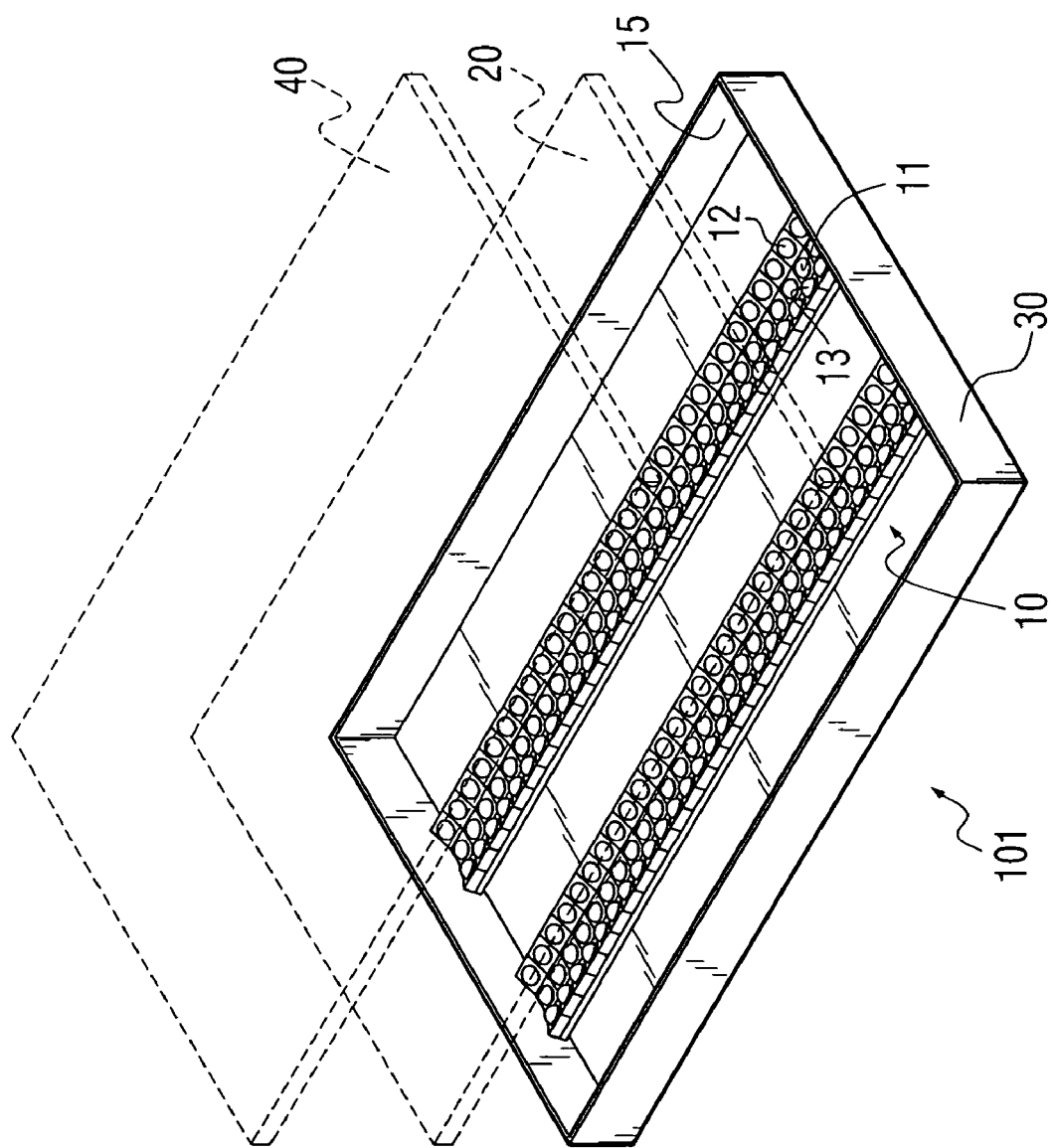
FIG. 7A is a schematic diagram of the invention utilized in the direct-light-type liquid crystal device.
Figure 7B:
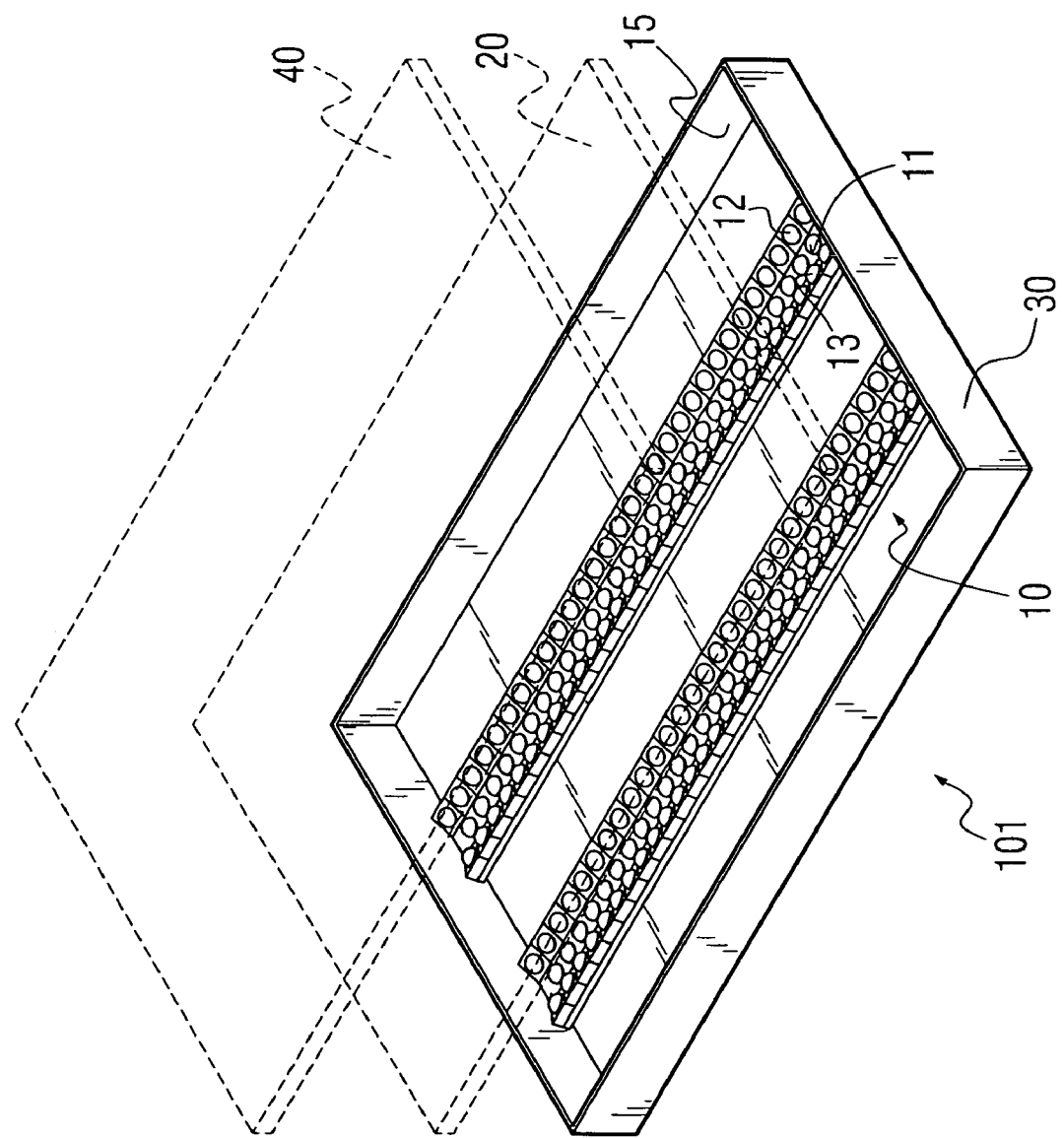
FIG. 7B is a schematic diagram of light source of the stagger-mode of arrangement of the invention utilized in the direct-light-type liquid crystal device.

FIG. 7A is a schematic diagram of the embodiment of the invention utilized in the back light source module 101 of the direct-light-type liquid crystal device. As shown in FIG. 7A, the invention includes a LCD panel 40 and a direct-light-type back light source module 101 disposed in corresponding with the LCD panel 40. The direct-light-type back light source module 101 includes a backplate 30, a light source fixture 10 disposed on the backplate 30, and a plurality of first light sources 11, a plurality of second light sources 12, and a plurality of third light sources 13 that are disposed in row-and-column on the light source fixture 10 respectively. The direct-light-type back light source module 101 also includes a diffusing plate 20 disposed between the LCD panel 40 and the backplate 30 for diffusing the light beams of the first light source 11, the second light source 12, and the third light source 13. The plurality of first light sources 11, the plurality of second light sources 12, and the plurality of third light sources 13, besides arranging in lattice-mode as shown in FIG. 7A, they can also arranges in stagger-mode as shown in FIG. 7B. The first light source 11, the second light source 12, and the third light source 13 can be the R-LED, the G-LED, or the B-LED respectively. And/or the first light source 11, the second light source 12, or the third light source 13 can be the W-LED.

Figure 8:
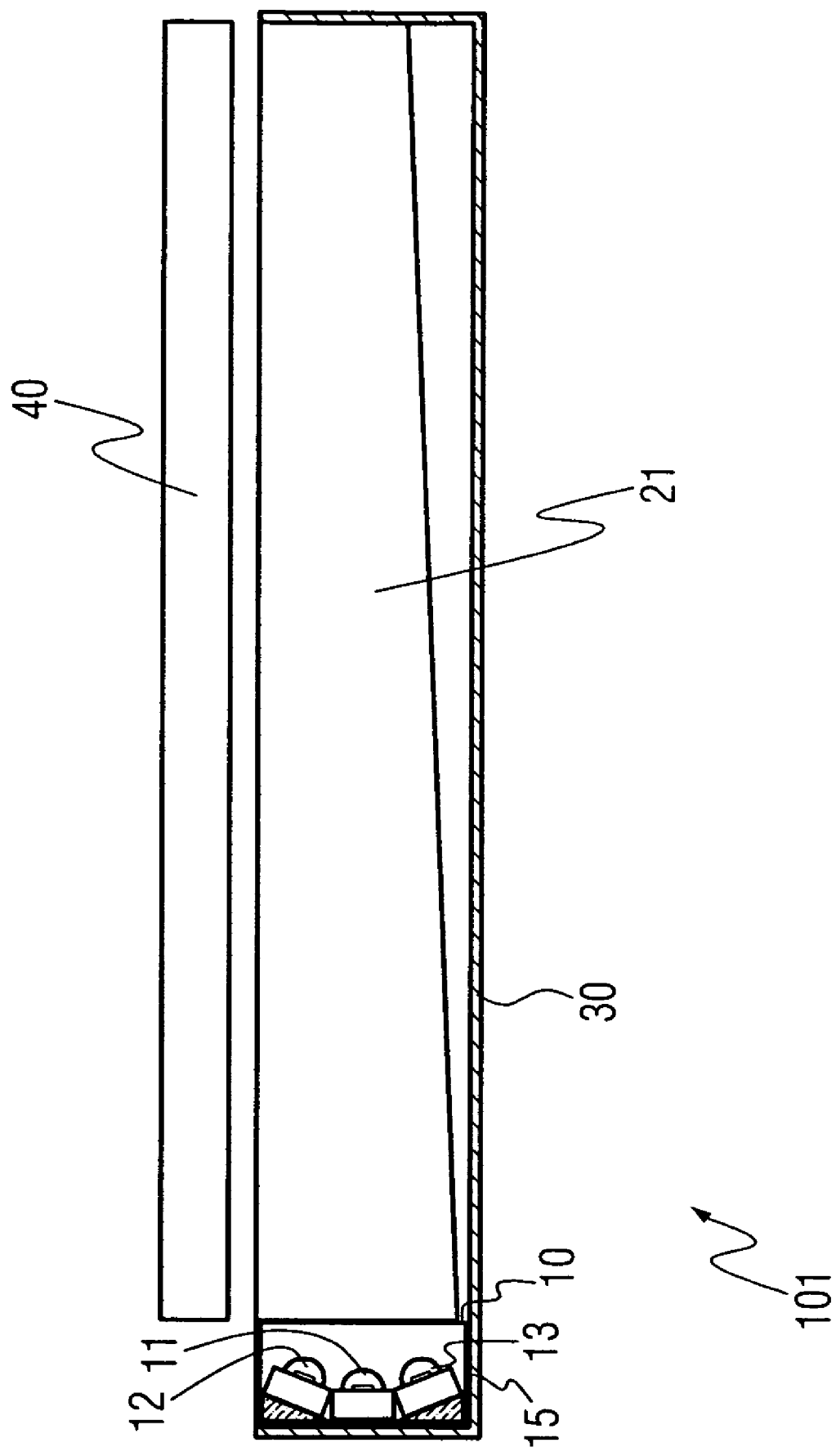
FIG. 8 is a cross-sectional view of the invention utilized in the side-light-type LCD.

FIG. 8 is a cross-sectional view of the invention utilized in the side-light-type LCD. As shown in FIG. 8, the invention includes a LCD panel 40 and a side-light-type back light source module 102 disposed in corresponding with the LCD panel 40. The side-light-type back light source module 102 includes a backplate 30, a light source fixture 10 disposed on the backplate 30, and a plurality of first light sources 11, a plurality of second light sources 12, and a plurality of third light sources 13 that are disposed in row-and-column on the light source fixture 10 respectively. The side-light-type back light source module 102 also includes a reflecting member 15 disposed between the light source fixture 10 and the backplate 30, a light guide plate 21 disposed in corresponding with the backplate 30 for guiding the plurality of first light sources 11, the plurality of second light sources 12, and the plurality of third light sources 13. Among them, the plurality of first light sources 11, the plurality of second light sources 12, and the plurality of third light sources 13, besides arranging in lattice-mode as shown in FIG. 7A, they can also arranges in stagger-mode. The first light source 11, the second light source 12, and the third light source 13 can be the R-LED, the G-LED, or the B-LED respectively. And/or the first light source 11, the second light source 12, or the third light source 13 can be a W-LED.

To summarize the above-mentioned description, the arranging mode and the back light source module of the LED provided by the invention not only can generate white light having uniform luminance but also can improve chromatic intensity and luminosity. Moreover, the LED of the invention is simple in structure, easy to manufacture, thereby, can lower the cost. Not only can the invention be used in the back light source module of the LCD, it can be used in the back light source module of the general purpose as well. Moreover, since the invention utilizing LED as light source is high in luminous efficiency, long in service life, and has better conditions to meet the environment protection rules comparing with the CCFL.

It will become apparent to those people skilled in the art that various modifications and variations can be made to the structure of the invention without departing from the scope or spirit of the invention. In view of the foregoing description, it is intended that all the modifications and variation fall within the scope of the following appended claims and their equivalents.

What is claimed is:

1. A back light source module, comprising:
   a backplate;
   a light source fixture having a bottom wall, a first lateral wall and a second lateral wall, and disposed on said backplate;
   a first light source having a bottom face opposing to a light emitting face thereof, and disposed on said bottom wall;
   a second light source having a bottom face opposing to a light emitting face thereof, and disposed between said bottom wall and said first lateral wall with the bottom face of the second light source facing both said bottom wall and said first lateral wall;
   a third light source having a bottom face opposing to a light emitting face thereof, and disposed between said bottom wall and said second lateral wall with the bottom face of the third light source facing both said bottom wall and said second lateral wall;
   wherein a first available space is formed by the bottom face of said second light source, said first lateral wall and said bottom wall, and a second available space is formed by the bottom face of said third light source, said second lateral wall and said bottom wall; and
   wherein said first light source, said second light source, and said third light source respectively have a first normal line, a second normal line and a third normal line, and a first angle formed between said second normal line and said first normal line and a second angle formed between said third normal line and said first normal 1 are both less than 90 degrees.

2. The back light source module as claimed in claim 1, wherein said first light source, said second light source, and said third light source are in contact with each other.

3. The back light source module as claimed in claim 1, wherein said first available space and said second available space are both in a column having a triangular cross-sectional area.

4. The back light source module as claimed in claim 1, wherein said first angle is between 30 to 45 degrees.

5. The back light source module as claimed in claim 1, wherein said second angle is between 30 to 45 degrees.

6. The back light source module as claimed in claim 1, wherein said first light source, said second light source, and said third light source are selected from the group consisting of a red light emitting diode, a green light emitting diode, a blue light emitting diode, and a white light emitting diode.

7. The back light source module as claimed in claim 1, further comprising a diffusing plate disposed to correspond with said backplate.

8. The back light source module as claimed in claim 1, further comprising a light guide plate disposed to correspond with said backplate.

9. The back light source module as claimed in claim 1, wherein said first light source, said second light source, and said third light source are disposed in parallel and in an array.

10. The back light source module as claimed in claim 1, wherein said first light source, said second light source, and said third light source are staggered.

11. A liquid crystal device, comprising:
    a liquid crystal display panel; and
    a back light source module disposed to correspond with said liquid crystal display panel, further comprising:
    a backplate;
    a light source fixture having a bottom wall, a first lateral wall and a second lateral wall, and being disposed on said backplate;
    a first light source having a bottom face opposing to a light emitting face thereof, disposed on said bottom wall;
    a second light source having a bottom face opposing to a light emitting face thereof, disposed between said bottom wall and said first lateral wall, with the bottom face of the second light source facing both said bottom wall and said first lateral wall;
    a third light source having a bottom face opposing to a light emitting face thereof, disposed between said bottom wall and said second lateral wall, with the bottom face of the third light source facing both said bottom wall and said second lateral wall;
    wherein a first available space is formed by the bottom face of said second light source, said first lateral wall and said bottom wall, and a second available space is formed by the bottom face of said third light source, said second lateral wall and said bottom wall; and
    wherein said first light source, said second light source, and said third light source respectively have a first normal line, a second normal line and a third normal line, and a first angle formed between said second normal line and said first normal line and a second angle formed between said third normal line and said first normal line are both less than 90 degrees.

12. The liquid crystal device as claimed in claim 11, wherein said first light source, said second light source, and said third light source are in contact with each other.

13. The liquid crystal device as claimed in claim 11, wherein said first available space and said second available space are both in a column having a triangular cross-sectional area.

14. The liquid crystal device as claimed in claim 11, wherein said first angle is between 30 to 45 degrees.

15. The liquid crystal device as claimed in claim 11, wherein said second angle is between 30 to 45 degrees.

16. The liquid crystal device as claimed in claim 11, wherein said first light source, said second light source, and said third light source are selected from the group consisting of a red light emitting diode, a green light emitting diode, a blue light emitting diode, and a white light emitting diode.

17. The liquid crystal device as claimed in claim 11, wherein said first light source, said second light source, and said third light source are disposed in parallel and in an array.

18. The liquid crystal device as claimed in claim 11, wherein said first light sources, said second light source, and said third light source are staggered.

19. The liquid crystal device as claimed in claim 11 further comprising a light guide plate disposed between said liquid crystal display panel and said backplate.

20. The liquid crystal device as claimed in claim 11 further comprising a reflecting member disposed between said light source fixture and said backplate.

* * * * *